United States Patent Office 3,391,205
Patented July 2, 1968

3,391,205
PROCESS OF CHEMICAL MANUFACTURE
Franklin Strain, Barberton, Ohio, and Paul D. Bartlett, Weston, Mass., assignors, by mesne assignments, to Pittsburgh Plate Glass Company
No Drawing. Filed Dec. 9, 1960, Ser. No. 74,789
13 Claims. (Cl. 260—655)

This invention relates to a new and novel method of preparation for organic compounds. It also relates to the generation of carbenes in the presence of vapors of an unsaturated acceptor substance. It further relates to the contact of carbenes with an unsaturated substance in the vapor phase.

Carbenes have been discussed in numerous articles in the chemical literature and their interesting and valuable reactivity has been pointed out by Hine et al. in a series of papers including Journal of American Chemical Society, 81, 1131–36 (1959). However, actual isolation of a carbene is as yet not possible on a practical basis. The existence of such compounds has been verified by their reaction products and isolation on a minute scale in the mass spectrograph (Blanchard et al., Canadian Journal of Chemistry, 35, 80 to 98 (1957)). Numerous workers have produced carbenes in the presence of an acceptor substance in the liquid phase and have isolated the carbene reaction products from various reactions in the liquid phase.

Now it has been discovered that carbenes provided in the vapor phase are captured by acceptors to form substances having compositions determined by those of the acceptor and the carbene. Thus, a convenient and novel method of synthesis is provided for useful substances containing a skeleton augmented by the number of carbene fragments captured.

In accordance with the present invention useful chemical products are prepared by contacting in a hot zone a gaseous stream comprising a carbene, provided in the vapor phase by thermal decomposition of a carbene precursor in said hot zone, and vapor containing an unsaturated substance which is not in itself a carbene generator whereby to produce reaction products therebetween in which the skeleton of the unsaturated substance is augmented by the number of carbene fragments captured and thereafter isolating the desired product.

In concurrence herewith reaction products result which are difficult to prepare otherwise. Another advantage also exists herein whereby many compounds may be prepared in fewer steps than are required in the liquid phase. Thus in the vapor phase, the carbene is generated, added to its acceptor substance and the resultant adduct decomposed and rearranged in one step. In the liquid phase this has been accomplished by isolation of the intermediate addition product of carbene and acceptor substance which is subsequently decomposed and rearranged. By way of illustration, propylene may be reacted in the liquid phase with a carbene generated therein, i.e.:

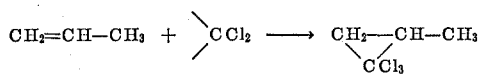

Subsequent to isolation of this intermediate, 1,1-dichloro-2-methylcyclopropane, it can be decomposed thermally, thus:

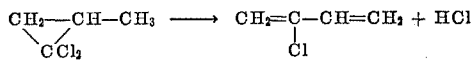

In the practice of the instant invention both of these operations occur in one step. Obviously the invention herein represents simplified procedure and economic advantage.

Carbenes are represented by the general formula:

where X is H, CN or halogen and Y is H, CN or a second halogen. Some substituted carbenes can be prepared in which either X or Y of the general formula for a carbene expressed above may be an organic residue such as $CH_3$, $C_6H_5$ or $C_6H_{11}$, that is X or Y may be substituted by thermally stable organic radicals which are members of the following groups: $C_nH_{2n+1}$, $C_nH_{2n-7}$, $C_nH_{2n-1}$, where $n$ is a small whole integer greater than 1.

While many substances are suitable for generation of carbenes in the liquid phase and in the presence of admixed unsaturated acceptor substances, only those precursors are suitable for use in this invention which can be volatilized directly into an apparatus comprising a hot zone such as provided by a hot tube and also those which can be volatilized directly into a stream of inert gas for transport to the hot zone while also possessing sufficient tendency to decompose to form carbenes at elevated temperatures but at temperatures insufficiently high to cause undue carbonation. Substances suitable for carbene generation correspond to the general formula:

where X is H, CN or halogen; Y is H, CN or halogen and Z is halogen other than fluorine. That is, a compound selected from the following group is satisfactory for use as a source of carbene:

| | |
|---|---|
| chloromethane, | dibromocyanomethane, |
| bromomethane, | diiodocyanomethane, |
| iodomethane, | chlorodicyanomethane, |
| trichloromethane, | bromodicyanomethane, |
| tribromomethane, | iododicyanomethane, |
| triiodomethane, | chlorobromocyanomethane, |
| difluorochloromethane, | chloroiodocyanomethane, |
| difluorobromomethane, | fluorochlorocyanomethane, |
| difluoroiodomethane, | fluorobromocyanomethane, |
| dichloroiodomethane, | bromoiodocyanomethane, |
| dichlorofluoromethane, | fluoroiodocyanomethane, |
| dichlorobromomethane, | dichloromethane, |
| chlorodibromomethane, | diiodomethane, |
| dibromoiodomethane, | dibromomethane, |
| fluorodibromomethane, | fluorochloromethane, |
| chlorodiiodomethane, | fluorobromomethane, |
| bromodiiodomethane, | fluoroiodomethane, |
| fluorodiiodomethane, | chlorobromomethane, |
| fluorobromoiodomethane, | chloroiodomethane, |
| chlorobromoiodomethane, | bromoiodomethane, |
| fluorochlorobromomethane, | chlorocyanomethane, |
| fluorochloroiodomethane, | bromocyanomethane and |
| dichlorocyanomethane, | iodocyanomethane. |

When a selected carbene precursor as indicated in the above formula is heated, it is decomposed to form a carbene and a hydrogen halide. For example, when X, Y and Z in the general formula for carbene precursor given above are all chlorine, the hydrogen halide which results from heating this substance will be hydrogen chloride. Thus, a characteristic of the reaction employed in this invention is the generation of by-product hydrogen halide equivalent to the amount of carbene precursor decomposed. If one mole of carbene precursor is decomposed, one mole of hydrogen halide will result. However, the second fragment of the decomposition, the carbene itself, is partially consumed by by-product reactions and sometimes may react with the carbene acceptor in a ratio other than one mole of carbene per mole of carbene acceptor. Thus, the quantity of hydrogen halide generally is greater than one mole of hydrogen halide per mole of product formed.

Certain of the products sought by the practice of this invention are thermally less stable than others. This results in nearly complete destruction of the products which are less stable under conditions of the reaction necessary to cause carbene generation. It is often expedient, therefore, to employ a catalytic substance which serves to lower the temperature at which the carbene precursor will decompose to yield reactive carbene fragments and hydrogen halide. Such useful catalysts are oxides and phosphates of alkaline earth metals which have been prepared by precipitation and on which halides of certain metals have been co-deposited during precipitation or by other usual means. Such metal halides are members of groups 1A, 1B, 2A, 2B and 3A of the Periodic Table of Elements.

A preferred procedure for carrying out the invention involves volatilization of a carbene precursor at any suitable temperature, after which the vapors so formed are conveniently heated to nearly the reaction temperature, generally above 300° C. and below 700° C. The preheated vapors are admixed with similarly preheated vapors of the acceptor substance, which is usually an unsaturated compound, preferably an unsaturated hydrocarbon. For this purpose an unsaturated hydrocarbon is defined as one which contains less hydrogen than is required by the general formula $C_nH_{2n+2}$ where $n$ is a whole number greater than 1. The resultant gaseous stream is conducted into a hot zone formed by heating to the reaction temperature a tube of any suitable inert composition to provide contact sufficiently long to cause carbenes to form and react with the acceptor. The product gases are then led into a suitable cooling device to cause condensation of at least a portion of the products.

Other than unsaturated hydrocarbons, it is frequently possible to employ compounds which are normally saturated while actually exhibiting the behavior of unsaturated compounds in this reaction. Certain substances not included in the above definition of an unsaturated hydrocarbon fall within this category by virtue of containing an unsaturated linkage in addition to some other functional group such as unsaturated ethers, esters, alcohols, nitriles and acids. Certain ketones, ethers and esters which although not conventionally unsaturated but which contain either a carbonyl double bond or an easily ruptured ether linkage may also be employed. One prerequisite is that these materials must not be decomposed during volatilization prior to contacting the carbene. A second prerequisite is that these materials are not in themselves carbene generators.

There are variations in general procedure which are sometimes suitably employed. A preheated stream of the acceptor substance is introduced separately into the hot zone of the reactor where contact with carbene is established. Alternatively, the reactor feed is formed by volatilizing a mixture of carbene precursor and acceptor which is preheated as a mixed stream prior to entering the reactor. Another suitable way of contacting the reacting substances comprises passing an inert gas through a liquid carbene precursor maintained at a temperature suitable for producing a previously calculated vapor composition followed by utilization of the resultant inert gas-carbene precursor stream as a feed similarly conducted through a liquid hydrocarbon acceptor substance likewise maintained at a previously selected temperature, and next, preheating this final gas stream to not above the reaction temperature before contacting said stream with the hot zone.

Any suitable device for cooling the products may be employed such as a heat exchanger, condenser, dephlegmator or a cold liquid spray supplied to a cooling tower through which is passed the hot gas stream for the purpose of contacting with a spray or shower of cooling liquid. When this latter device is employed, it is expedient to use the carbene precursor or the hydrocarbon acceptor substance as cooling liquid, thus simplifying the isolation procedure. Following condensation of the reactants any suitable means of separation may be employed. Most generally suitable is a fractional distillation procedure selected in accordance with the various boiling points involved. It is sometimes expedient to employ a partial condensation technique to condense the principal products for further separation by distillation procedure. Such condensation leaves in suitable condition for recycling, the residual inert gas and in other cases, unconsumed reactants.

The temperature employed for volatilization of the carbene precursor is generally arbitrarily selected. In the case that no inert gas is employed a temperature somewhat above the normal boiling point of the carbene precursor is satisfactory. By way of illustration, when chloroform is employed as the carbene precursor, a temperature above 61° C. is employed, say 80° C. It is often desirable to employ a temperature much above the boiling point in order to compensate for heat loss from the apparatus. Any convenient temperature below that of the decomposition temperature of chloroform is employed in this instance. Obviously, the temperature employed for volatilization of the carbene precursor must depend on the particular carbene precursor chosen and must lie between its boiling point and its decomposition temperature. Temperatures below the normal boiling point of the carbene precursor are useful for providing the gaseous feed stream only when an inert gas is also employed. In this instance, however, the temperature must be high enough to result in a significant and suitable fractional vapor pressure from the precursor.

Similar considerations dictate the choice of temperature employed in vaporization of the hydrocarbon acceptor substance. Generally the volatilization temperature will lie between the temperature at which the vapor pressure is sufficient if inert gas is also used and the decomposition temperature of the acceptor substance. Most generally temperatures between the boiling point of the compound selected and 300° C. are employed.

The actual reaction temperature is dictated by the decomposition temperature of the carbene precursor since this temperature must be attained before a carbene can form. Since carbenes have a relatively short life, it is necessary that they when once formed be contacted rapidly with the acceptor substance. Hence, it is necessary that the acceptor substance be admixed before reaching the reaction temperature. Alternatively the acceptor substance in gaseous form and at the reaction temperature is directly introduced into the hot zone.

The invention will be better understood by reference to the following examples.

EXAMPLE I

A glass tube approximately 1 inch in diameter and 24 inches long was arranged to be heated by an electric furnace in such a manner that the tube sloped slightly downward approximately 5 degrees. Glass fittings were attached to the entrance of this tube to permit the slow dropwise introduction of chloroform and the admission of a stream of propylene gas supplied from a cylinder via a calibrated flowmeter. The exit end of the glass tube was attached to suitable glass fittings to permit passing the effluent through a water cooled condenser and thence through a series of two cold traps with a final exit permitting escape of unconsumed propylene to a hood.

The furnace was heated to 530° C. while passing a slow stream of propylene through the apparatus. When the temperature was properly adjusted the flowmeter providing the propylene was set to provide 5.32 liters per hour of propylene gas at standard temperature and pressure. This rate of propylene flow corresponded to 0.238 mole of propylene per hour. Immediately after setting the propylene flow, the dropwise introduction of chloroform was begun at a rate of 0.235 mole per hour. The reaction temperature fluctuated thereafter but was maintained in the range of 528 to 533° C. throughout a period of 4.25 hours after which the system was flushed with nitrogen to carry all products forward into the trap system.

Among the products obtained were a liquid fraction of 76 grams in which was contained chloroprene equivalent to 4.7 weight percent of the consumed chloroform as demonstrated by gas-liquid chromatography.

EXAMPLE II

The procedure of Example I was repeated at 540° C. for a period of 3 hours to result in products containing 1.04 moles of hydrogen chloride and 0.023 mole of chloroprene.

EXAMPLE III

Employing the apparatus of Example I, 60 grams (0.5 mole) of chloroform mixed with 40 grams (0.5 mole) cyclohexene was added from a dropping funnel through an appropriate glass fitting to the reaction tube. This was accomplished during a 2 hour period at a temperature of 530° C. The products were collected in cold traps as employed in Example I except that ice cooling was sufficient. Examination of the products collected revealed a 70 mole percent yield of hydrogen chloride and 74.0 grams of dark liquid. A portion of the dark liquid (47.5 grams) was fractionated through a Vigreux column up to a distillate temperature of 85° C. at 10 millimeters absolute pressure. From this distillation 39.5 grams of relatively volatile liquid was found in the Dry Ice trap. A yellow oil fraction was caught in an ice-cooled receiver for the distillate and weighed 4 grams. These two liquid fractions were examined by vapor-liquid chromatography and found to contain 8.8 area percent and 13.3 area percent toluene in the trap fraction and liquid fraction, respectively. Calculated on the basis of the original feed materials 6.2 grams or 23 weight percent toluene based on chloroform not recovered was obtained.

In lieu of the cyclohexene employed in Example III above the reaction may be carried out with indene, cis and trans-butylenes, isobutylenes, styrene, ethylene, acetylene, diphenylacetylene, cyclopropane, benzene, isopropylbenzene, indane, durene, xylene and mesitylene. In lieu of the chloroform employed in Example III methylene dichloride, chloromalonyl nitrile, chlorocyanocarbethoxymethane, chlorocarbethoxymethane, dichlorofluoromethane, difluoromethane, benzal chloride, diphenylchloromethane and phenylcyanochloromethane may be employed.

Frequently the reaction of the carbene precursors with carbene acceptors form products which are less valuable than derived decomposition products. This is true as in Example I above wherein the first product of reaction is 1,1-dichloro-2-methylcyclopropane. This product, however, is unstable under the conditions of the reaction, i.e. at 530° C. whereupon further decomposition results in the more useful product, chloroprene. Similar decomposition occurs in Example III wherein toluene is formed. Thus, the invention may be practiced to form many types of products some of which may be further decomposed in the reaction zone to form useful products directly.

The proportions which are employed in pursuit of the invention are quite broad. Utilization of the carbene occurs when its concentration is as low as one mole percent of the gaseous mixture. Likewise, a rather high fraction of the gaseous mixture can be carbene, that is up to as high as 10 mole percent or even higher. However, extreme variations in concentration are uneconomical and at such high concentrations as 10 mole percent carbene in the gaseous mixture large fractions react with themselves or decompose further to carbonaceous material. Thus, the reaction is carried out with a high proportion of carbene acceptor relative to the carbene precursor. That is, 90 mole percent or more of the acceptor substance may be present in the vapor which is fed to the reactor and which contains less than 10 mole percent of carbene precursor. The resultant ratio of reactants is desirably maintained in the range indicated even though dilution with an inert gas may be utilized as a means of carrying one or the other reactant into the reactor.

Generally the reaction of the carbenes formed in situ with their acceptor substance can be carried out at standard pressure. Other pressures may be employed ranging from one tenth atmosphere up to five atmospheres. Ideally the reaction is best performed within 0.5 atmosphere to 2.0 atmospheres. It is preferable to practice the invention by continuously generating the required vaporous reactants, continuously preheating these and continuously conducting them into the reactor. Moreover, if a device of partial separation is employed to remove the synthesized products, it is generally convenient to return at least a portion of the uncondensed materials to comprise a portion of the continuous feed. In such manner the reaction temperature is better controlled.

Substances which are not inert but which are fed to the reactor as impurities usually do no harm other than complicating the product separation and purification. It is usually desired, however, that materials which decompose readily and lead to increased carbonation be excluded from the preheaters and the reactor.

While the invention has been described with reference to the detail of certain specific embodiments, it is not intended that the invention be limited thereto except insofar as indicated by the following claims.

We claim:

1. A method of producing chemical products which comprises passing through an elevated temperature zone at from 300° C. to 700° C. a gaseous stream comprising vapor of an olefinically unsaturated hydrocarbon and the carbene which is generated in the said gaseous stream by evolving hydrogen halide from a substituted methane of the formula

said carbene being characterized by the formula:

where X and Y are both selected from the group of radicals which consists of H, CN, and halogen, and Z is a halogen other than fluorine whereby to produce reaction products therebetween in which the skeleton of the unsaturated hydrocarbon is augumented by the number of carbenes captured.

2. A method of producing chemical products by contacting with a hot surface at a temperature from 300° C. to 700° C. a gaseous stream comprising a carbon compound characterized by the formula:

where, X and Y are both selected from the group of radicals which consists of H, CN, and halogen, and Z is halogen other than fluorine, whereby to eliminate hydrogen halide from said carbon compound and form a carbene of said carbon compound contiguous with vapor containing an aliphatic olefinically unsaturated hydrocarbon to produce in the said gaseous stream reaction products therebetween and thereafter recovering the products from the said gaseous stream.

3. A method of producing chemical products by reaction in the vapor phase at a temperature of from 300° C. to 700° C. of a carbene characterized by the formula:

where, X and Y are both selected from the group of radicals which consists of H, CN, and halogen with a reactive aliphatic olefinically unsaturated hydrocarbon which comprises generation of said carbene by eliminating hydrogen halide from a compound having the formula

wherein X and Y are as already defined and Z is a halogen other than fluorine in the presence of said reactive unsaturated hydrocarbon in the vapor phase, and thereafter recovering the products.

4. A method of producing chloroprene by contacting a mixture comprising propylene and chloroform with a hot zone maintained at from 300° C. to 700° C. whereby to produce chloroprene and thereafter recovering chloroprene from the product mixture.

5. A method of producing toluene by contacting a mixture comprising cyclohexene and chloroform with a hot zone maintained at from 300° C. to 700° C. whereby to produce toluene and recovering toluene from the product mixture.

6. The method of claim 3 in which the reactive unsaturated hydrocarbon is propylene.

7. The method of claim 1 in which the reactive unsaturated hydrocarbon is cyclohexene.

8. A method of producing chemical products by reaction in the vapor phase of a carbene of a carbon compound, thermally generated from partially halogenated methane, with a reactive aliphatic olefinically unsaturated hydrocarbon which comprises generation of said carbene by the elimination of hydrogen halide from the partially halogenated methane in the presence of said reactive unsaturated hydrocarbon in the vapor phase at from 300° C. to 700° C. and thereafter recovering the products from the said gaseous stream.

9. A method of producing chemical products by contacting in a hot zone at from 300° to 700° C. a gaseous stream comprising vapor or an olefinically unsaturated hydrocarbon and a methylene radical generated from a partially substituted methane in the said gaseous stream and substituted by at least one other radical selected from the group which consists of halogen and nitrile radicals, whereby to produce in the said gaseous stream reaction products therebetween in which the carbon skeleton of the unsaturated substance is augmented by the number of methylene radicals captured.

10. A method of producing chemical products by contacting with a hot surface a gaseous stream at 300° C. to 700° C. comprising a partially substituted methane substituted by a halogen other than fluorine and at least one other radical selected from the group which consists of halogen and nitrile radicals, whereby to form a carbene of said carbon compound contiguous with vapor containing an olefinically unsaturated hydrocarbon to produce reaction products therebetween and thereafter recovering the products from the said gaseous stream.

11. A method of producing chemical products by reaction in the vapor phase at 300° C. to 700° C. of a methylene radical substituted by at least one other radical selected from the group which consists of halogen and nitrile radicals, with a reactive olefinically unsaturated hydrocarbon which comprises generation of said methylene radical by the elimination of hydrogen halide from a partially halogenated methane in the presence of said reactive unsaturated hydrocarbon in the vapor phase and thereafter recovering the products.

12. The process for the non-catalytic production of chloroprene which consists essentially of thermally and non-catalytically reacting propylene with chloroform in the vapor phase, at a temperature of from about 300° to about 700° C.

13. The process for the non-catalytic production of halodienes which consists essentially of thermally and non-catalytically reacting a mono-olefinic hydrocarbon with a trihaloalkane, in the vapor phase, at a temperature of from about 300° to about 700° C.

References Cited

UNITED STATES PATENTS

| 2,440,800 | 5/1948 | Hanford et al. | 260—658 |
| 2,468,208 | 4/1949 | Kharasch | 260—658 |
| 2,551,639 | 5/1951 | Feasley et al. | 260—654 X |
| 2,979,541 | 4/1961 | Pitt et al. | 260—658 X |
| 3,076,042 | 1/1963 | Pitt et al. | 260—655 |

FOREIGN PATENTS 844,442   7/1952   Germany.

OTHER REFERENCES

Semeluk et al.: J. Am. Chem. Soc., 76, pp. 3793–6 (1954).

Semeluk et al.: J. Am. Chem. Soc., 79, pp. 46–9 (1957).

Doering: J.A.C.S., vol. 80, 5274–7 (1958).

Winberg: J. Org. Chem., vol. 24, pp. 264–5 (1959).

BERNARD HELFIN, *Acting Primary Examiner.*

LEON ZITVER, A. D. SULLIVAN, *Examiners.*

C. R. DAVIS, K. V. ROCKEY, *Assistant Examiners.*